(12) United States Patent
Lindsey

(10) Patent No.: US 9,928,188 B2
(45) Date of Patent: Mar. 27, 2018

(54) BATTERY PACK TO REGULATE ACCESS TO MEDIA SYSTEMS

(71) Applicant: Michael David Lindsey, Fort Collins, CO (US)

(72) Inventor: Michael David Lindsey, Fort Collins, CO (US)

(73) Assignee: MediaLeash, LLC, Fort Collins, CO (US)

( * ) Notice: Subject to any disclaimer, the term of this patent is extended or adjusted under 35 U.S.C. 154(b) by 0 days.

(21) Appl. No.: 14/742,472

(22) Filed: Jun. 17, 2015

(65) Prior Publication Data

US 2016/0196225 A1    Jul. 7, 2016

Related U.S. Application Data

(60) Provisional application No. 62/013,696, filed on Jun. 18, 2014.

(51) Int. Cl.
*G06F 13/36* (2006.01)
*G06F 13/42* (2006.01)

(52) U.S. Cl.
CPC .......... *G06F 13/36* (2013.01); *G06F 13/4282* (2013.01)

(58) Field of Classification Search
CPC ....................................................... G06F 13/36
USPC ......................................................... 710/260
See application file for complete search history.

(56) References Cited

U.S. PATENT DOCUMENTS

| | | | | |
|---|---|---|---|---|
| 6,342,010 B1* | 1/2002 | Slifer | ...................... | A63F 13/06 434/351 |
| 8,608,564 B2* | 12/2013 | Navid | ...................... | A63F 13/24 463/36 |
| 2005/0170889 A1* | 8/2005 | Lum | ...................... | A63F 13/06 463/39 |
| 2006/0038537 A1* | 2/2006 | Heigl | ...................... | B25F 5/00 320/114 |
| 2006/0073761 A1* | 4/2006 | Weiss | ...................... | A63H 17/00 446/456 |
| 2009/0015208 A1* | 1/2009 | White | ................. | H01M 2/1022 320/150 |
| 2009/0266898 A1* | 10/2009 | Miller | ................. | G06K 7/0004 235/472.01 |

* cited by examiner

*Primary Examiner* — Jason C Olson
(74) *Attorney, Agent, or Firm* — Michael D. Lindsey

(57) ABSTRACT

Disclosed are devices which regulate the access to media systems such as console gaming systems by means of disconnecting the human interface device such as a wireless controller. Specifically, devices where the control circuitry is integrated into the battery pack of the input device allowing it to be retrofitted easily into the controller.

5 Claims, 6 Drawing Sheets

BATTERY PACK TO REGULATE ACCESS TO MEDIA SYSTEMS

CROSS-REFERENCE TO RELATED APPLICATION

The present patent application is based upon and claims the benefit of U.S. Provisional Patent Application Ser. No. 62/013,696, filed on Jun. 18, 2014, by Michael David Lindsey, entitled "Battery with Conditional Access," which is hereby specifically incorporated herein by reference for all that it discloses and teaches.

BACKGROUND

The regulating of video entertainment has long since been a point of conflict between parents and children. Excessive amounts of TV or video games have often been considered a sedentary and isolating activity. Currently, dedicated media consoles sold by Nintendo, Microsoft, and Sony collectively sell in excess of 20 million systems per year worldwide.

A report by the Entertainment and Software Association entitled, "2013 Sales, Demographic, and Usage Data— Essential facts about the computer and video game industry" shows that 79% of parents in the US place time limits on video game play. Manually tracking and enforcing a time-based strategy often burdens the parent and manifests as a point-of-contention in the parent-child relationship as requests to shut-off the device are met with resistance and pleas for additional time. Attempts to automate this process have been implemented by both game console manufactures, television manufacturers, and as standalone devices which disable the media system itself; however, these approaches are not always user friendly, have their own limitations such as multiplayer situations, and even damage the media system.

By integrating a regulating control circuitry into the human input device of a media system, such as the wireless controller of a console system, the child's access to the media system is enforced without prejudice, thus removing the parent from the point-of-conflict. In addition, by placing regulating device within a controller, individual participation may be metered appropriately when there are multiple players participating in game play.

SUMMARY OF THE INVENTION

The embodiment of the present invention comprises integrating regulating device within the battery pack of the human input device of a media system, such as the controller of a gaming console, for the purpose of regulating the user's ability to interact with the media system. Also disclosed are methods for accessing the time-regulating parameters by the administrator, methods for user identification, and methods to detect user requests for operation of the human input device.

A challenge exists in making the regulating device operate seamlessly into the daily routines of the user and truly integrating with the existing system such that no additional devices require interaction beyond those provided by the game console manufacturer. Once the configuration of the regulating device has been set by the administrator, the enforcement must remain in effect throughout operation. When the conditions-for-access are met, it is desirable that there are minimal steps beyond those required by the gaming console manufacturer to use the regulating device. In turn, minimal steps for the user to pause or halt the consumption of their regulated time allowance is a necessary to prevent users from consuming additional time while not active. In certain situations the regulating device may need to manage multiple users and configurations; thus in those scenarios the regulating device must employ a method for identifying the user or administrator. A method to override the regulating device may also be employed when additional access is allowed by an administrator when there is a non-structured situation. The regulating device may provide warning to the user prior to deactivating the control when the allowed access has been depleted. Lastly, the regulating device may also provide an interface which is capable of communicating with other peripherals such as: pedometers to provide access based on a configurable award for merit such as minutes spent performing physical activity, keys which may be transferred from one media device to another, or other devices beyond the scope of this application.

In the disclosed embodiment the regulating device, methods for integrating with an existing controller, auto-detecting interaction with the user, and non-limiting examples of external peripherals are presented.

A BRIEF DESCRIPTION OF THE DRAWINGS

DETAILED DESCRIPTION OF THE INVENTION

Figure 1:
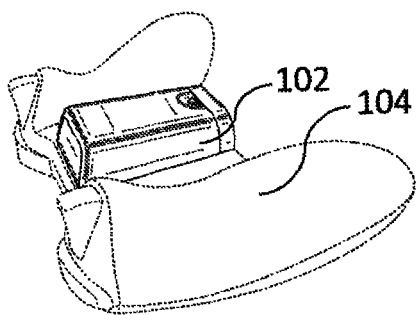
FIG. 1 is an illustration of a wireless game controller and removable battery pack.
Figure 2:
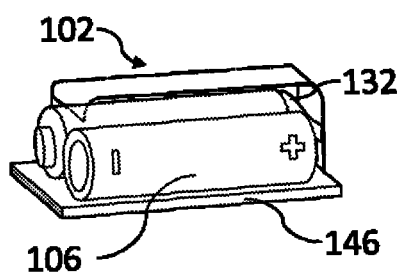
FIG. 2 is a cutaway illustration of a controller battery pack.

A human interface device for a media system is a device which is manipulated by the user to communicate with the media system. Non-limiting examples of human interface device of a media system may be embodied by handheld controllers or optical sensor for a console based gaming system, mice or keyboard for a PC based system. FIG. 1 is an illustration of a human interface device in the form of a wireless controller 104 for the X-Box360™ with a removable battery pack 102. FIG. 2 is a cut-away of the battery pack 102 which is designed to receive two AA batteries 106. The batteries 106 are installed in series and connected via a booth bar 132. The controller 104 is compatible with both Alkaline and nickel-metal hydride (NiMH) battery chemistries. Alkaline batteries have a nominal voltage of 1.5 Volts and NiMH has a nominal voltage of 1.2 Volts. As these batteries 106 are installed in series, the controller 104 receives a power supply that is initially 2.4 to 3.0 volts when the batteries are fully charged.

The wireless controller 104 for the X-Box 360™ has several operating states with various current draw from the batteries. When the controller 104 is in standby and not transmitting or receiving information from the game console, current draw is typically under 100 uA. Once the controller 104 is powered up, current draw increases to approximately 37 milliamps. Current draw may be increased to upwards of 250 milliamps by either the addition of peripherals, such as headphones or keyboard which act as a continuous current draw, or sporadically by features such as heavy rumble vibration within the controller.

Figure 3:
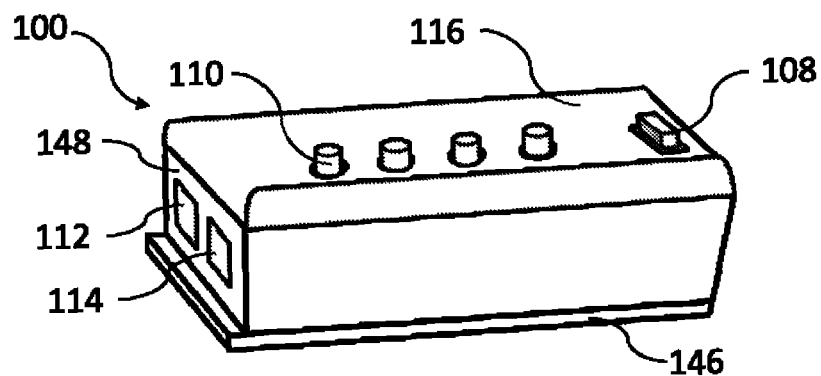
FIG. 3 is isometric view of a regulating battery pack for a wireless controller.

FIG. 3 is an isometric illustration of a regulating device 100 in the form factor with critical dimensions conforming to the mating surfaces between the battery pack 102 and the wireless controller 104.

The external face 116 is shown with tactile switch 110 inputs which may be used to identify the user or administrator, over-ride or set parameters for configuration, or other simple interactions. A communication port 108 is provided for more complex interactions and charging. In some instances, multiple communication ports may be implemented.

The power interface surface 148 has both a positive battery plate 112 and a negative battery plate 114. When the regulating device 100 is enabled by the control circuitry 126 there is a voltage differential output between the positive battery plate 112 and negative battery plate 114 within the required operating voltage range to enable full functionality of the wireless controller 102. When the regulating device 100 is disabled by the control circuitry, the voltage differential between the positive battery plate 112 and negative battery plate 114 may be fully interrupted or current-limited to maintain features such as standby power.

Figure 4:
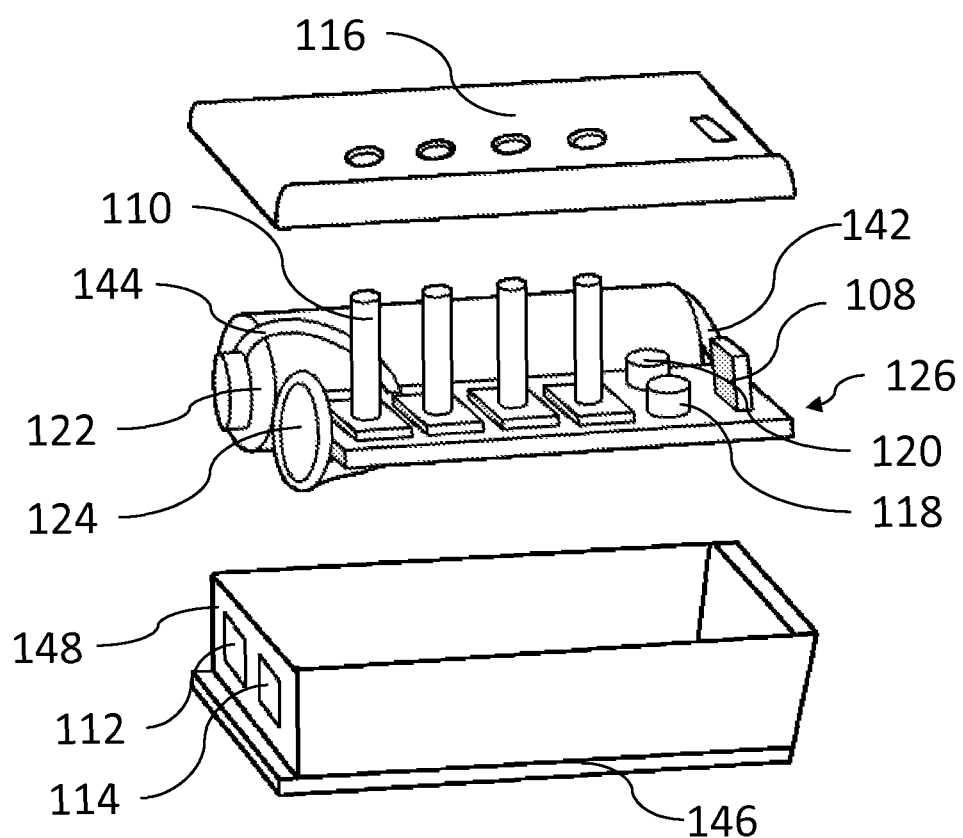
FIG. 4 is an exploded view of the circuitry integrated into the battery pack.

FIG. 4 provides an exploded view of the regulating circuitry 126, battery 122, and construction of the regulating device 100. In this construction, a single lithium-ion polymer or LiPo battery 122 is used as the power source. To minimize space required, this battery chemistry is preferred as lithium based batteries have a nominal voltage of 3.7 volts which exceeds the voltage required by the wireless controller 104. Rechargeable LiPo batteries 122 are provided by a numerous suppliers include US based Tenergy brand model number 14500 which is a cylindrical 3.7 Volt 800 mAh rechargeable battery.

FIG. 4 also shows the regulating circuitry 126 which comprises of a switched power plate 124, simple tactile switches 110, external communication port 108, and internal sensors 120 to detect use, and wireless communication peripherals 118 such as RFID and near-field communication. Both the positive and negative terminals of the LiPo battery 122 are connected in parallel to the circuit board and provide constant power to the regulating circuitry 126 through bus bars 144 and 142. When assembled the positive tip of the LiPo battery 112 makes electrical contact with the positive battery plate 112 and the switched power plate 124 makes electrical contracts with the negative battery plate 114. Polarity may also be reversed such that the switched power plate 124 is connected to the positive tip of the LiPo battery 112 and the negative battery plate 124 is connected to the negative terminal of the LiPo battery 112.

Figure 5:
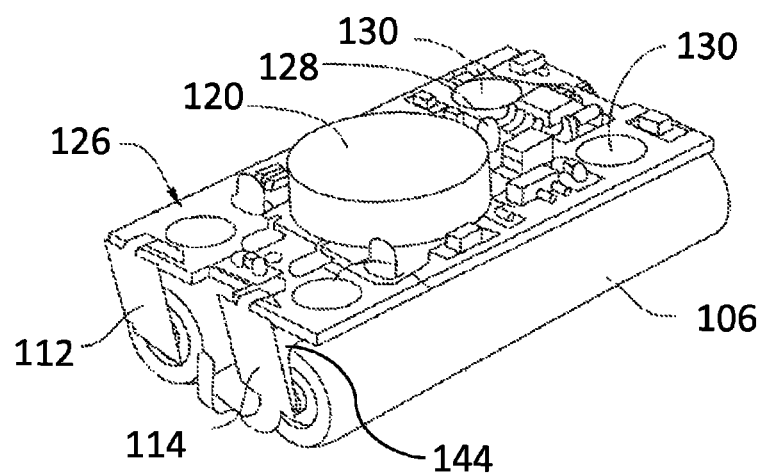
FIG. 5 is an illustration of the regulating circuitry with two batteries.

FIG. 5 is an example of an alternative construction for the regulating circuitry 126 where the device is powered by two batteries 106. This allows the use of lower voltage batteries such as Alkaline and NiMH, but may increases package size.

Figure 6:
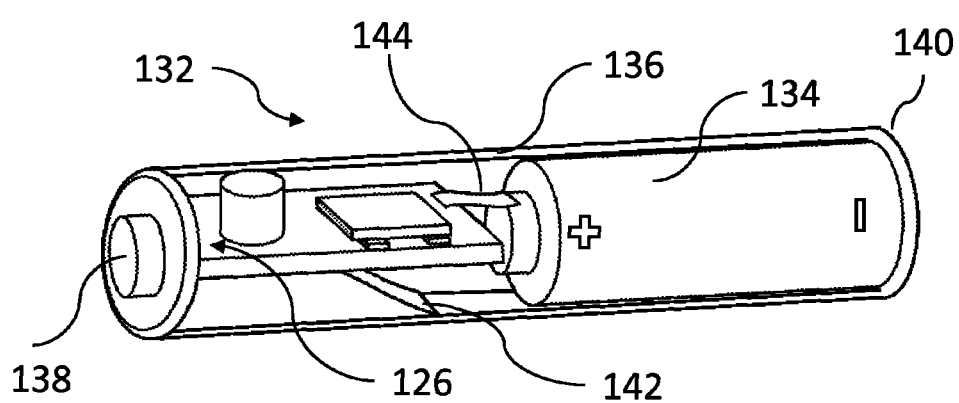
FIG. 6 is an illustration of the regulating circuitry within a single battery form factor.

FIG. 6 is an alternative embodiment where the regulating circuitry 126 and small form-factor battery 134 are contained within a standard battery form factor 132, such as a full size AA. This configuration has the advantage that it may be installed within any number of existing products. The small form factor battery 134 may be a 2/3AA or a combination of button cell batteries to achieve the voltage required by the device. The negative terminal 140 of the small form-factor battery is connected to the circuit board via bus bar 142. The positive terminal of the small form-factor battery is connected via bus bar 144. The switched battery terminal in this configuration is the positive tip 138.

Figure 7:
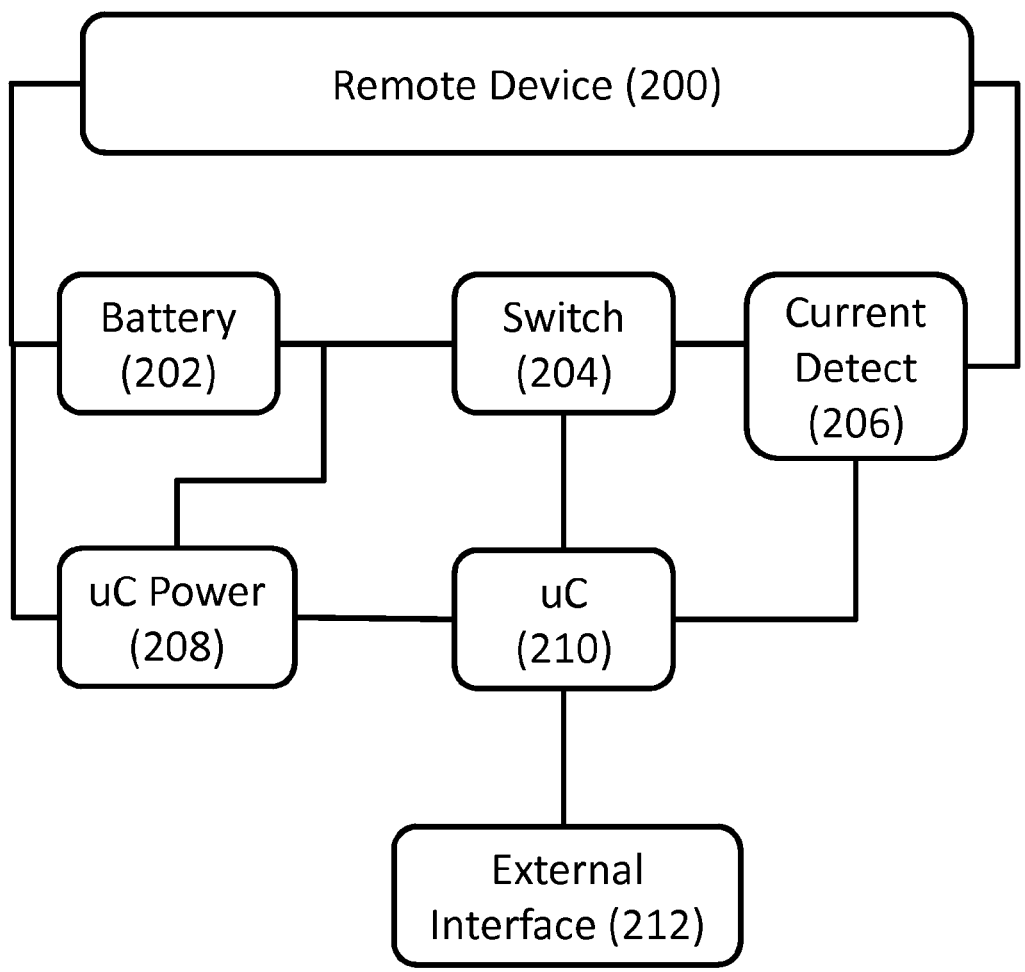
FIG. 7 is a block diagram of the circuitry used in the device.

A functional block diagram of a regulating control device circuitry and the remote device 200 under control is shown in FIG. 7. The device is designed to perform two basic tasks: detect and identify the user, enable/disable power to the remote device. Knowledge of complex electronics are not a requirement and the basis for generic implementation is provided herein. A microcontroller 210 is shown in FIG. 7 as uC and receives power from the microcontroller power circuitry 208 which is shown as uC Power on FIG. 7. So long as the battery 202 has ample power, the microcontroller 210 is always powered and capable of performing function such as maintaining real-time clock operation as well as monitoring inputs and sensors. The microcontroller power 208 block may include circuitry for the purpose or recharging the battery. The switch 204 can be implemented in the form of a transistor, relay, MOSFET, etc. Current detect 206 circuitry can be implemented any number of ways, but commonly a voltage drop through a sense resistor or diode is sufficient for this application and can be sampled by an analog-to-digital converter in the microcontroller 210.

In the case of the wireless controller application, the microcontroller 210 enables the power switch 204 to be active during standby. A small signal diode is used in the current detect 206 circuitry as the voltage drop across the part is easily detectable as current goes from 80 micro amps when the controller is in standby mode to 37 milliamps active mode, but does not further linearly drop when it needs to source 260 milliamps as a resistor would. The switch 204 is turned off only when time limits have been exceeded.

External Interface 212 includes the power source to charge the battery 202, as well as a variety of wired and wireless communication. Non-limiting examples of the information which may be exchanged are logs of play time, battery status including voltage levels and number of times recharged, configuring access settings, overriding settings, tokens for player identification, as well as interaction with other regulating devices that may be implemented within the users environment. Non-limiting examples of the physical implementation of this are: radio wave communication including RFID or Near-Field Communication protocols; memory devices such as USB memory sticks, stand-alone integrated circuits such as EEPROM or flash; wired communication such as serial, USB, I2C, etc. to a PC; or simple interfaces such as buttons and optical LED displays.

Figure 8:
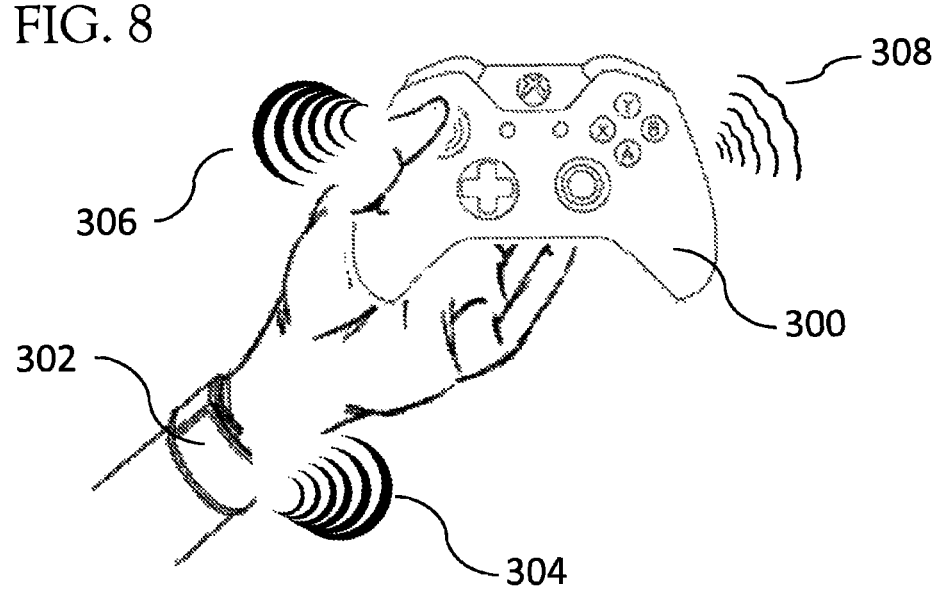
FIG. 8 is a view of an RFID interface for user identification.
Figure 9:
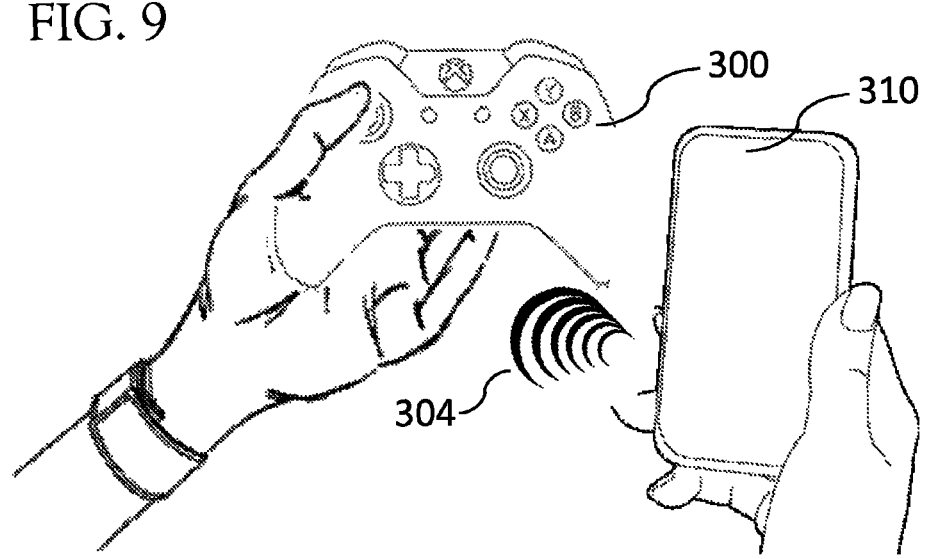
FIG. 9 is a view of a Near Field Communication used for configuration.

FIG. 8 illustrates how a controller 300 may communicate with an RFID or NFC type device embedded 302 in a bracelet or other personal token. In multi-user scenarios each user may have their configuration and access rights and identification of the user is bound to the unique code within the RFID chip as well as their configuration access. The regulating controller 300 may communicate with the RFID to both identify the user and log activity back onto the write access portion of the RFID. The RFID may contain information from other devices that participate in monitoring activity. In a similar method, FIG. 9 illustrates how a controller may communicate to a mobile phone 310 for configuration, identification, access, or logging through NFC, Wi-Fi, or other wireless methods 304.

FIG. 8 also shows an alternative method to detect user interaction may include an accelerometer where the movement of the regulating device 308 is detected.

Figure 10:
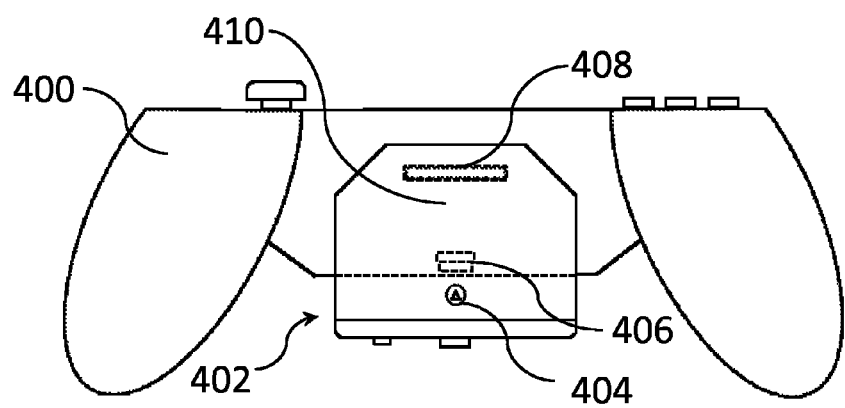
FIG. 10 is an illustration of integrated tamper devices for a battery pack.

FIG. 10 shows a method to prevent tampering and unauthorized use of the controller 400. Battery packs have a method to prevent them from falling out. In the current Xbox 360™ this is accomplished with a spring loaded latch 406 which can be disengaged by pressing a button on the battery pack. To prevent a user from removing the regulating battery pack 402 from the controller 400 a security screw 404 is set which locks the latch 406 in place. Alternate physical methods such as a cam can also be used. Controller 400 may also have a wired port 408 for recharging or playing when connected to the gaming console. A plastic shield 410 may be integrated into the battery pack 402 to prevent said wired access.

What is claimed is:

1. A battery pack for a wireless gaming controller, said battery pack comprising:
   a mechanical housing with an inner cavity and an outer surface,
   said outer surface configured to mechanically mate with said gaming controller and comprising a power interface,
   said power interface configured to provide power to said gaming controller and characterized by a positive power plate and a negative power plate, and
   said inner cavity having a chemical based power source and a control circuit;
   said control circuit comprising a microcontroller, a current measurement circuit configured to provide an electrical signal to said microcontroller indicative of current draw through the power interface,
   a switch controlled by said microcontroller configured to enable and disable an electrical connection between said power source and said power interface, and
   a user interface on said outer surface of the mechanical housing;
   said user interface in electrical communication with said microcontroller and characterized by an optical indicator and a plurality of tactile switches wherein said microcontroller is configured to identify a user by actuation of said tactile switches.

2. The battery pack of claim 1 wherein said microcontroller is configured to provide a real-time clock.

3. The battery pack of claim 1 wherein said microcontroller is configure to provide a warning to said user prior to disabling the electrical connection between said power source and said power interface.

4. The battery pack of claim 1, further comprising a wireless link, wherein said wireless link is selected from the group consisting of radio frequency identification, near field communication and Wi-Fi.

5. The battery pack of claim 1, wherein said control circuit further comprises an accelerometer in communication with said microcontroller.

* * * * *